US006748581B1

(12) United States Patent
Bauer et al.

(10) Patent No.: US 6,748,581 B1
(45) Date of Patent: Jun. 8, 2004

(54) APPARATUS AND METHOD FOR IMPLEMENTING AN EXISTING OBJECT-ORIENTED CLASS IN AN OBJECT MANAGEMENT SYSTEM

(75) Inventors: Andreas Bauer, Acton, MA (US); Munish Desai, Shrewsbury, MA (US); Kathleen Moxham, Hopkinton, MA (US); Thomas Price, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/515,773

(22) Filed: Feb. 29, 2000

(51) Int. Cl.[7] .................................................. G06F 9/44
(52) U.S. Cl. ........................ 717/107; 717/136; 717/140; 719/310
(58) Field of Search ................................. 717/100–123, 717/136, 137, 140; 709/200–203, 310–317, 328–332

(56) References Cited

PUBLICATIONS

Whiteside et al., A COBRA–based Manufacturing Environment, Jan. 1997, Sandia National Laboratories, Livermore, CA.*

Norrie–Wurgler, OMS Object–oriented Data Management System Introductory Tutorial, Mar. 1998, Institute for Information System ETH Zurich, CH–8092 Zurich, Switzerland.*

Stroustrup, C++ Programming Language, Third Edition, Jul. 1998, Addison–Wesley Publishing Company, pp. 76–78, 823–824.*

Schmidt–Vinoski, Object Interconnections, Sep. 1996, SIGS C++ Report magazine.*

Hoen et al., From OO to Components: Components at the Type and Instance Level (exended abstract), Feb. 2000.*

Gokhale et al., The design and performance of a OMG CORBA IDL Compiler Optimized for Embedded Systems, May 1999, LCTES '99 workshop at PLDI, Atlanta, Georgia, May 1–4, 1999.*

Grimes, et al., *Beginning ATL COM Programming*, pp. 53–68 (Canada, 1998).

* cited by examiner

Primary Examiner—Antony Nguyen-Ba
(74) Attorney, Agent, or Firm—Bromberg & Sunstein LLP (57) ABSTRACT

An apparatus and method for implementing one or more existing object-oriented program classes as component objects in an object management system, each class including one or more member functions, each class being defined in a header file, builds an information list, the information list including a list of the classes and the member functions in each class, processes the information list, the processing including parsing the header file for each class and reading a type file, the type file including computer code for converting between an object-oriented type and an object management type, and generates from the processed information list one or more output files for each component object, each component object implementing the member functions of one class.

61 Claims, 6 Drawing Sheets

APPARATUS AND METHOD FOR IMPLEMENTING AN EXISTING OBJECT-ORIENTED CLASS IN AN OBJECT MANAGEMENT SYSTEM

FIELD OF THE INVENTION

The invention generally relates to computer programming and, more particularly, the invention relates to computer programming tools.

BACKGROUND OF THE INVENTION

In object-oriented program languages, such as C++ and Smalltalk, a computer program typically consists of a number of objects. The objects, which contain both data and the functions that operate on the data, communicate with each other by calling one another's functions. An object's functions typically are the only way to access the object's data. If, for example, a program wants to read an object's data, the program calls the object's function. In turn, the object's function will read the data and return a value.

Objects are organized into classes. A class of objects is a specification for creating an object. In other words, an object is a single instance of a class of objects, with similar objects belonging to the same class. As a specification for an object, a class contains both data and the functions that operate on the data.

In the same manner, classes are organized into libraries. A library of classes of objects is a collection of classes logically related to each other to perform a particular task.

An object management system, such as Distributed Component Object Model ("DCOM") and Common Object Request Broker Architecture ("CORBA"), allows classes created by different software vendors to interact with one another in the same address space, across address spaces, and across networks. However, in order to implement existing classes in an object management system, a programmer must write the necessary computer code. Typically, three computer files need to be written for each existing object-oriented program class-an interface file, a header file and a source file. The process can be complex and time-consuming. For example, in one project, in which 300 computer files with approximately 150,000 lines of computer code needed to be written, the programming team estimated the time needed to complete the project would be approximately 2 man years. Moreover, the potential for programming bugs is tremendous and, typically, these programming bugs can be difficult to locate.

In some object management systems, tools are available to help write the needed computer code. For example, Microsoft's Visual Studio contains an Active Template Library wizard to help with the creation of computer code for Microsoft's DCOM. These tools, however, are more suited to-creating new objects in the object management system, referred to as component objects, rather than implementing existing object-oriented program classes as component objects in the object management system. However, even in using the tools, a programmer still needs to write a significant amount of implementation code. For the project described above, the programming team estimated it would still need approximately 15 man months to complete the project using the available tools.

SUMMARY OF THE INVENTION

In accordance with one aspect of the invention, a method and apparatus implements one or more existing object-oriented program classes as component objects in an object management system. Each class includes one or more member functions and each class is defined in a header file. First, the method and apparatus builds an information list. The information list includes a list of the classes and the member functions in each class. The method and apparatus then processes the information list. The processing includes parsing the header file for each class and reading a type file. The type file includes computer code for converting between an object-oriented type and an object management type. Last, the method and apparatus generates from the processed information list one or more output files for each component object, each component object implementing the member functions of one class.

In accordance with another aspect of the invention, a method and apparatus implements an existing object-oriented program class as a component object in an object management system, the class being defined in a header file. First, the method and apparatus reads the header file. The header file includes a list of member functions for the class. Next, the method and apparatus parses the header file. Then, the method and apparatus reads a type file. The type file includes computer code for converting between an object-oriented type and an object management type. The method and apparatus then generates a source file for the component object. The source file comprises computer code for use in implementing the listed member functions in the object management system based on the conversion code in the type file. Next, the method and apparatus generates an interface file for use in implementing the component object. When compiled, the interface file comprises one or more object management interfaces for the class. Last, the method and apparatus generates an object management header file for the component object.

In a further embodiment of both aspects of the invention, the output file (or files) are compiled into an object management server. In still further embodiments of both aspects of the invention, at least one class includes an excluded member function, the excluded member function being omitted in the one or more output files for the component object for the at least one class. In addition, at least one class includes an override member function, the override member function being pasted into the one or more output files for the component object for the at least one class. Further, at least one class includes an enums member function, the enums member function listed in an enums file, the enums file being read and parsed, and an enums interface file being generated. As an output file, the enums interface file is also compiled into the object management server.

In alternate embodiments of both aspects of the invention, the one or more existing object-oriented program classes are C++ classes. In addition, the object management system may be a Distributed Component Object Model.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF THE INVENTION

In accordance with one embodiment of the invention, a computer programming tool implements an existing object-oriented program ("OOP") class, such as an existing C++ class, as a component object in an object management ("OM") system, such as Distributed Component Object Model ("DCOM"). The tool, referred to generally as a COMCompiler, automates the generation of the computer code needed to implement the existing OOP class as a component object in the OM system.

Figure 1:
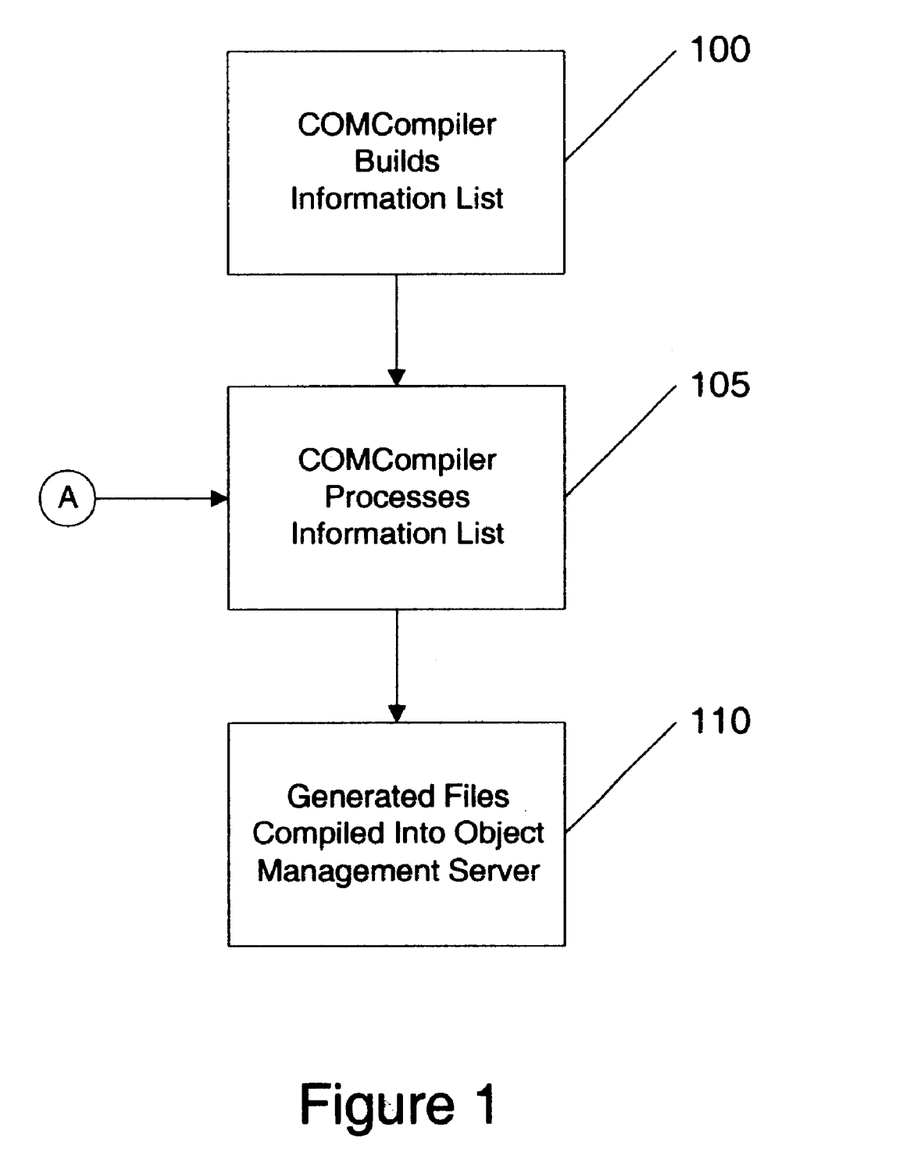
FIG. 1 is a flowchart of an exemplary process for implementing various embodiments of the invention for existing object-oriented program classes, with input and output files shown for each process.

FIG. 1 is a flowchart of an exemplary COMCompiler's processes for implementing various embodiments of the invention for existing OOP classes, with input and output files shown for each process. The process begins at step 100, in which the COMCompiler builds an information list. The information list contains, among other things, the names of the OOP classes that will be implemented as component objects and the functions for each OOP class, referred to as member functions. In alternative processes for various embodiments of the invention, the information list may also contain the excluded member functions for each OOP class (discussed below) and the override member functions for each OOP class (discussed below). In building the information list, the COMCompiler reads the header file for each OOP class, and a class list file.

The header file for each OOP class is a text file that contains, among other things, basic information about the OOP class. For example, the header file includes a list of the member functions in the OOP class.

The class list file is a text file that contains, among other things, a list of the header files for the OOP classes that are to be implemented in the OM system. In order to ensure the existing OOP classes maintain their inheritance class hierarchy, the header files should be ordered by dependency of inheritance and containment. In object-oriented programming, an inheritance class hierarchy results because a class of objects may be derived from another class of objects. For example, ClassB may be derived from ClassA. If ClassB is derived from ClassA, then ClassB inherits the member functions of ClassA, resulting in an inheritance class hierarchy.

At step 105, the COMCompiler processes the information list, generating one or more output files for each component object. In an alternative process for various embodiments of the invention, the COMCompiler also generates maintainability files (discussed below). In processing the information list, the COMCompiler parses the header file for each OOP class and reads a type file.

Data is characterized by its type. For example, in C++, the number "2" is an "int" data type (short for integer), the number "3.5" is a "double" data type, and the letter "G" is a "char" data type (short for character). In an OM system, however, the number "2" may be a different data type, e.g., it might be a "long" data type. The difference between an "int" data type and a "long" data type might be the amount of memory used to store the value, A, 2 bytes for "int" data type and 4 bytes for "long" data type.

The type file is a text file that contains, among other things, the computer code for converting between an OOP data type and an OM data type. The conversion code may call a function to perform the conversion, or the conversion code may be inserted into the file, i.e., be an inline conversion. The type file has the following format:

$1^{st}$ Column: OOP Type $2^{nd}$ Column: OM Type $3^{rd}$ Column: OOP Type to OM Type Conversion Rule $4^{th}$ Column: OM Type to OOP Type Conversion Rule For example, in implementing an existing C++ class in DCOM, the type file might include, among other things, the following computer code:

int LONG "(LONG) %o " "(int) %c"

char* BSTR "CharToBSTR(%o)" "BSTRToRWCString (%c).data( )" for converting an "int" data type and a "char" data type. The "%o" is replaced with the OM parameter and the "%c" is replaced with the OOP parameter. A parameter, also referred to as an argument, is the value passed to a function. For example, for the square root function SQRT(36), "36" is the parameter, i.e., the value passed to the function. In contrast, "6" is the value returned to the function.

The type file may also contain "empty" conversion code-conversion code that is not listed in the type file for a particular data type. The following computer code illustrates "empty" conversion code:

MyListOfThings VARIANT "" ""

These "special" data types may be converted with the use of an override file (discussed below).

The process concludes at step 110, in which the generated files are compiled into an OM server. In an OM system, application is interact on the basis of a client/server model. An OM client is a module of computer code, e.g., an application, that calls a particular service. The service is supplied by a component object in the OM system. An OM server is a module of computer code, e.g., an application, that implements the component object. An OM server might be an in-process server (runs in the same process space as the OM client), a local server (runs in a separate process on the same computer as the OM client), or a remote server (runs in a separate process on a separate computer). The type of server chosen is based on the requirements of implementation and deployment.

Figure 2:
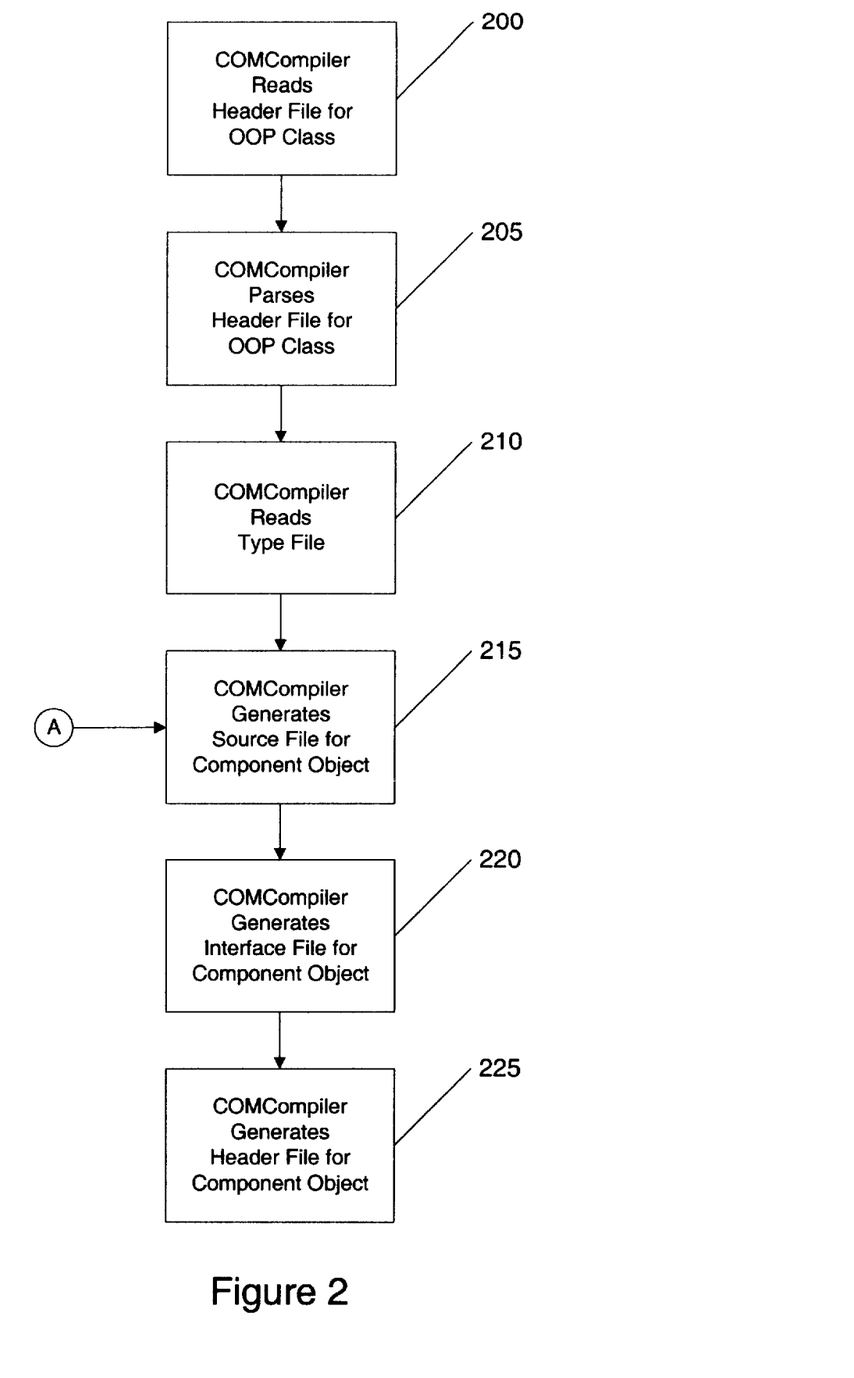
FIG. 2 is a flowchart of an exemplary process for implementing various embodiments of the invention for one existing object-oriented program class.

FIG. 2 is a flowchart of an exemplary COMCompiler's processes for implementing various embodiments of the invention for one existing OOP class. The process begins at step 200, in which the COMCompiler reads the header file for the OOP class. The process continues at step 205, in which the COMCompiler parses the header file. Next, at step 210, the COMCompiler reads a type file.

At step 215, the COMCompiler generates a source file that, ultimately, will be compiled into an OM server. The source file is a text file that contains, among other things, the computer code that allows a particular member function in an existing OOP class to be called by an OM client, i.e., implemented in the component object. In effect, the source file "wraps" the existing OOP class in OM computer code. The computer code is generated from, among other things, the conversion code in the type file.

The process continues at step 220, in which the COMCompiler generates an interface file that, ultimately, is compiled into the OM server. The interface file is a text file that contains, among other things, the computer code needed to generate one or more OM interfaces for the component object. In an OM system, OM clients communicate with component objects via OM interfaces.

Next, at step 225, the COMCompiler generates an OM header file that, ultimately, is compiled into the OM server. The OM header file is a text file that contains, among other things, basic information about the component object.

In an alternative process, the COMCompiler implements more than one existing OOP class, each as its own component object, in the OM system. In this alternative process, the COMCompiler first reads, sequentially, the class list file. Then, the COMCompiler parses the header files, in the listed order.

Figure 3:
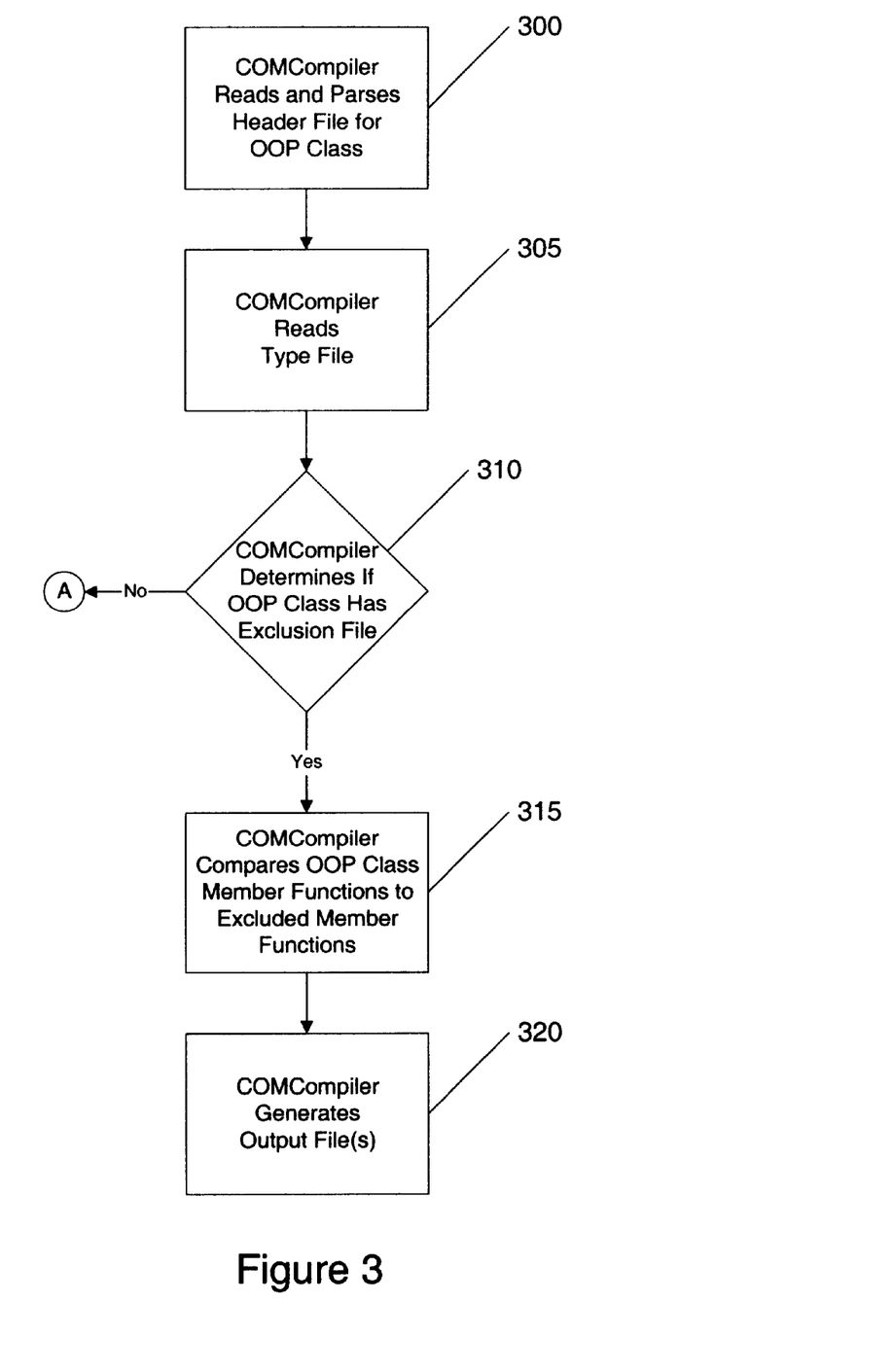
FIG. 3 is a flowchart of an exemplary process for implementing various embodiments of the invention for an existing object-oriented program class that contains one or more member functions that will not be implemented in the component object in the object management system.

FIG. 3 is a flowchart of an exemplary COMCompiler's processes for implementing various embodiments of the invention for an existing OOP class that contains one or more member functions that will not be implemented in the component object in the OM system. The process begins at step 300, in which the COMCompiler reads and parses the header file for an existing OOP class. The process continues at step 305, in which the COMCompiler reads a type file (described above).

Next, at step 310, the COMCompiler determines whether the existing OOP class has an exclusion file. For example, the COMCompiler might look for a file with the same short name as the OOP class, but with ".exclusion" as the extension. The short name for an OOP class might be listed in a text file that associates the OOP class name with its short name.

The exclusion file is a text file that contains, among other things, a list of member functions. These listed member functions, referred to as excluded member functions, are member functions in the existing OOP class which will not be implemented in the component object, i.e., cannot be called by the OM client.

If the COMCompiler determines that the existing OOP class has an exclusion file, then the process continues at step 315, in which the COMCompiler compares the member functions in the existing OOP class with the excluded member functions. At step 320, the COMCompiler generates one or more output files for the component object (e.g., source file), excluding from the output file (or files) computer code for implementing the member functions in the existing OOP class which are also excluded member functions.

If the COMCompiler determines that the existing OOP class does not have an exclusion file, then the process continues as discussed in either the exemplary process shown in FIG. 1 (step 105 and step 110) or the exemplary process shown in FIG. 2 (step 215 through step 225).

Figure 4:
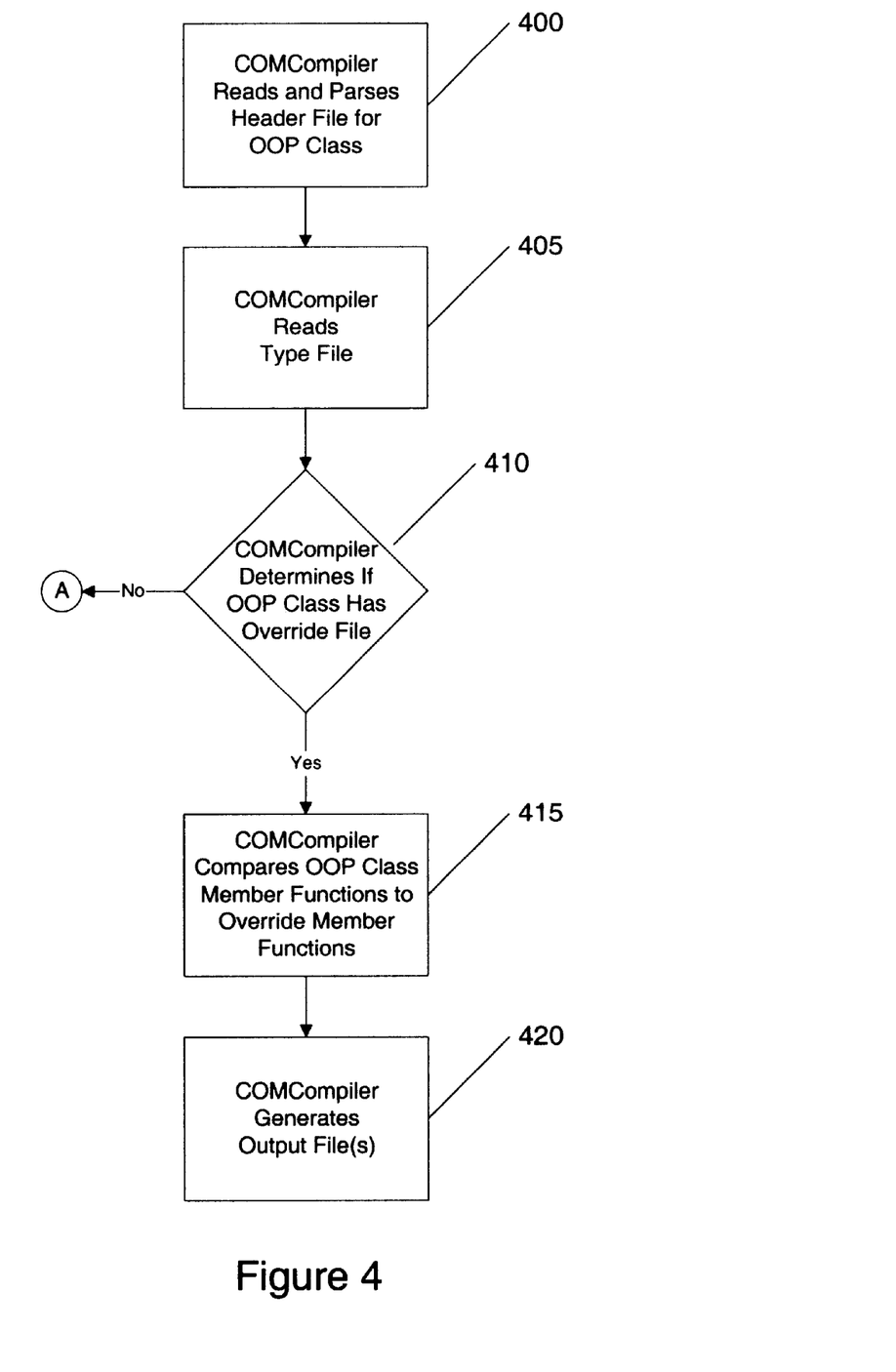
FIG. 4 is a flowchart of an exemplary process for implementing various embodiments of the invention for an existing object-oriented program class that contains one or more special data types.

FIG. 4 is a flowchart of an exemplary COMCompiler's processes for implementing various embodiments of the invention for an existing OOP class that contains one or more special data types. A special data type is a data type which cannot be converted using generic conversion code, e.g. safe arrays, variants, lists of strings, etc. The process begins at step 400, in which the COMCompiler reads and parses the header file for an existing OOP class. The process continues at step 405, in which the COMCompiler reads a type file (described above).

Next, at step 410, the COMCompiler determines whether the existing OOP class has an override file. For example, the COMCompiler might look for a file with the same short name as the OOP class, but with ".override" as the extension. As discussed above, the short name for an OOP class might be listed in a text file that associates the OOP class name with its short name.

The override file is a text file that contains, among other things, specific computer code for implementing one or more member functions-in particular, member functions involving a special data type, in the component object. In other words, the specific computer code is the computer code that will be used to implement a "special data" member function, referred to as an override member function, in the component object, when the override member function is called by the OM client.

If the COMCompiler determines that the existing OOP class has an override file, then the process continues at step 415, in which the COMCompiler compares the member functions in the existing OOP class with the override member functions. At step 420, the COMCompiler generates one or more output files, pasting into the output file (or files) the specific computer code from the override file, rather than generating computer code based on the type file.

If the COMCompiler determines that the existing OOP class does not have an override file, then the process continues as discussed in either the exemplary process shown in FIG. 1 (step 105 and step 110) or the exemplary process shown in FIG. 2 (step 215 through step 225).

In an alternative process for implementing various embodiments of the invention, an existing OOP class has both an exclusion file and an override file. In this alternative process, the COMCompiler generates one or more output files, excluding from the output file (or files) computer code for implementing the member functions in the existing OOP class which are also excluded member functions and pasting into the output file (or files) the specific computer code from the override file, rather than generating computer code based on the type file.

Figure 5:
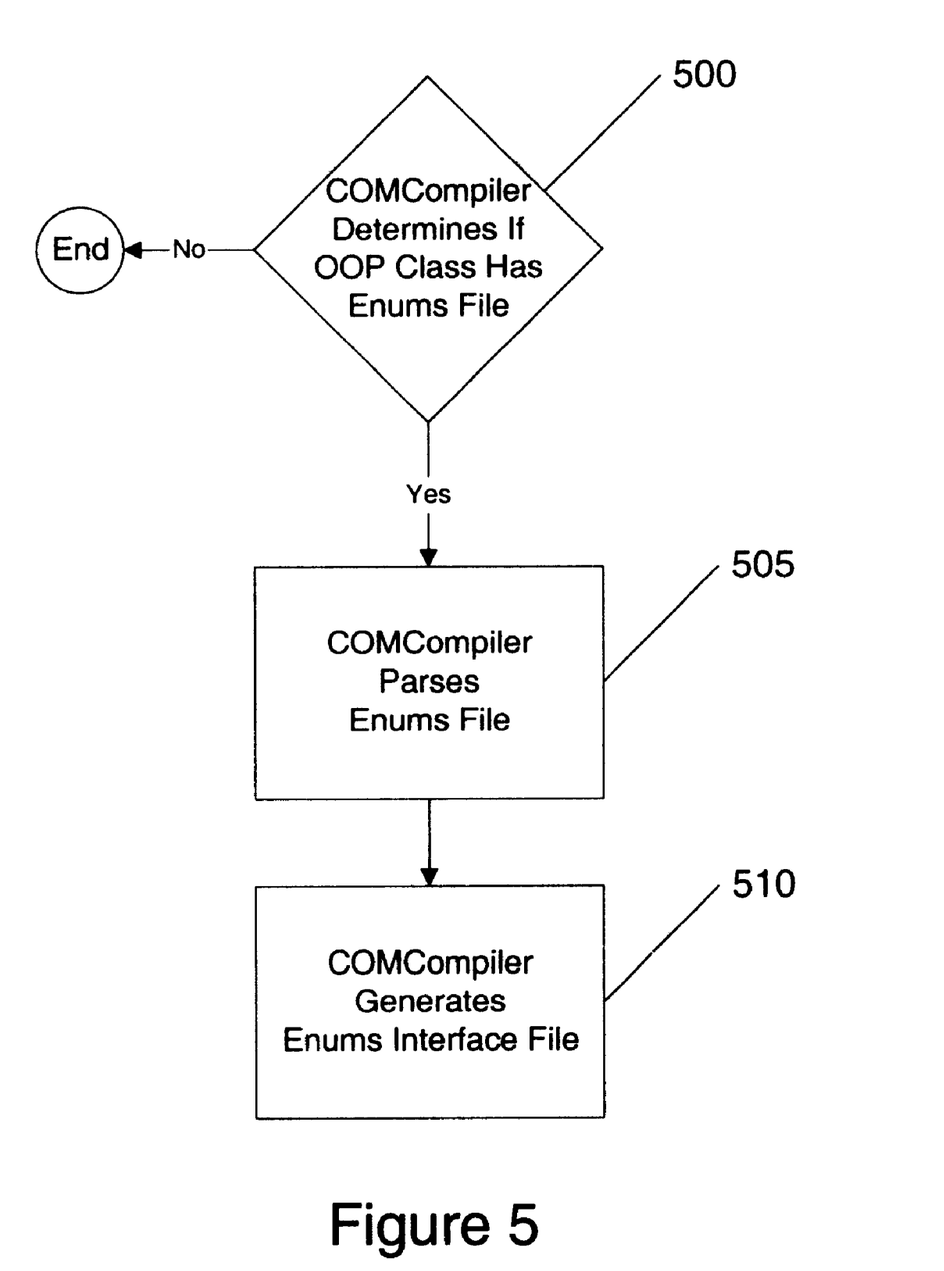
FIG. 5 is a flowchart of an exemplary process for implementing various embodiments of the invention for an existing object-oriented program class that contains one or more enumerated data types.

FIG. 5 is a:flowchart of an exemplary COMCompiler's processes for implementing various embodiments of the invention for an existing OOP class that contains one or more enumerated data types ("enum"). An enumerated data type is a data type created by a computer programmer. A computer programmer typically creates an enum when a variable (data) has only a few allowable values. For example, the enum "days_of_week" has only seven values-Sunday, Monday, Tuesday, Wednesday, Thursday, Friday and Saturday.

The process begins at step 500, in which the COMCompiler determines whether the existing OOP class has an enums file. For example, the COMCompiler might look for a file with the same short name as the OOP class, but with ".enums" as the extension. As discussed above, the short name for an OOP class might be listed in a text file that associates the OOP class name with its short name.

The enums file is a text file that contains, among other things, specific computer code for implementing one or more member functions-in particular, member functions involving an enumerated data type, in the component object. In other words, the specific computer code is the computer code that will be used to implement an "enums" member function in the component object when the "enums" member function is called by the OM client. The enums file may also contain the full path names of header files that contain only enumerated data types.

If the COMCompiler determines that the existing OOP class has an enums file, then the process continues at step

505, in which the COMCompiler parses the enums file. At step 510, the COMCompiler generates an interface file that, ultimately, is compiled into the OM server. The enums interface file is a text file that contains, among other things, the computer code needed to generate one or more enum interfaces for the component object. As discussed above, in an OM system, OM clients communicate with component objects via OM interfaces.

As discussed above, an OM system allows OOP classes created by different software vendors to interact with one another in the same address space, across address spaces, and across networks. If component objects and interfaces were given name-based identifications, the probability of accidental connection between component objects that were not designed to interact with each other is great. Thus, some OM systems utilize unique identifiers ("UIDs") for component objects and interfaces. When a new interface is generated, a UID must also be generated. In the same manner,.when a new component object is generated, a UID must also be generated. In one exemplary process for implementing various embodiments of the invention, the COMCompiler automatically generates the UID when the COMCompiler generates a new interface or component object. In an alternative process, the COMCompiler reads a UID file containing, among other things, the UIDs for the component objects and interfaces to be used in the OM server.

For each component object, the COMCompiler generates one or more output files, e.g., a source file, an interface file, and a header file. In another exemplary process for implementing various embodiments of the invention, the COMCompiler also generates maintainability files that, ultimately, will be compiled in the OM server. These maintainability files might include, among other files, an orphan file, a callback member function file, an all-interfaces file, and an all-functions file.

The orphan file is a text file that contains, among other things, a list of member functions in the existing OOP class that were not implemented in the component object. For example, the orphan file would list the member functions in the existing OOP class that were excluded member functions. It might also list member functions that the COMCompiler did not know how to implement in the component object. For these member functions, the type file and/or the override file would need to be updated and the COMCompiler re-run. The orphan file may also contain the name of the header file containing the orphaned member function.

The callback member function file is a text file that contains, among other things, a list of the member functions involving callback functions. A callback function is a function in an application that "calls back" the requester, e.g., the OM client, with previously requested information.

The all-interfaces file is a text file that contains, among other things, a list of all the interfaces in the OM server. The all-functions file is a text file that contains, among other things, a list of all the member functions in the existing OOP class (or classes) implemented in the component object (or component objects) in the OM server.

Figure 6:
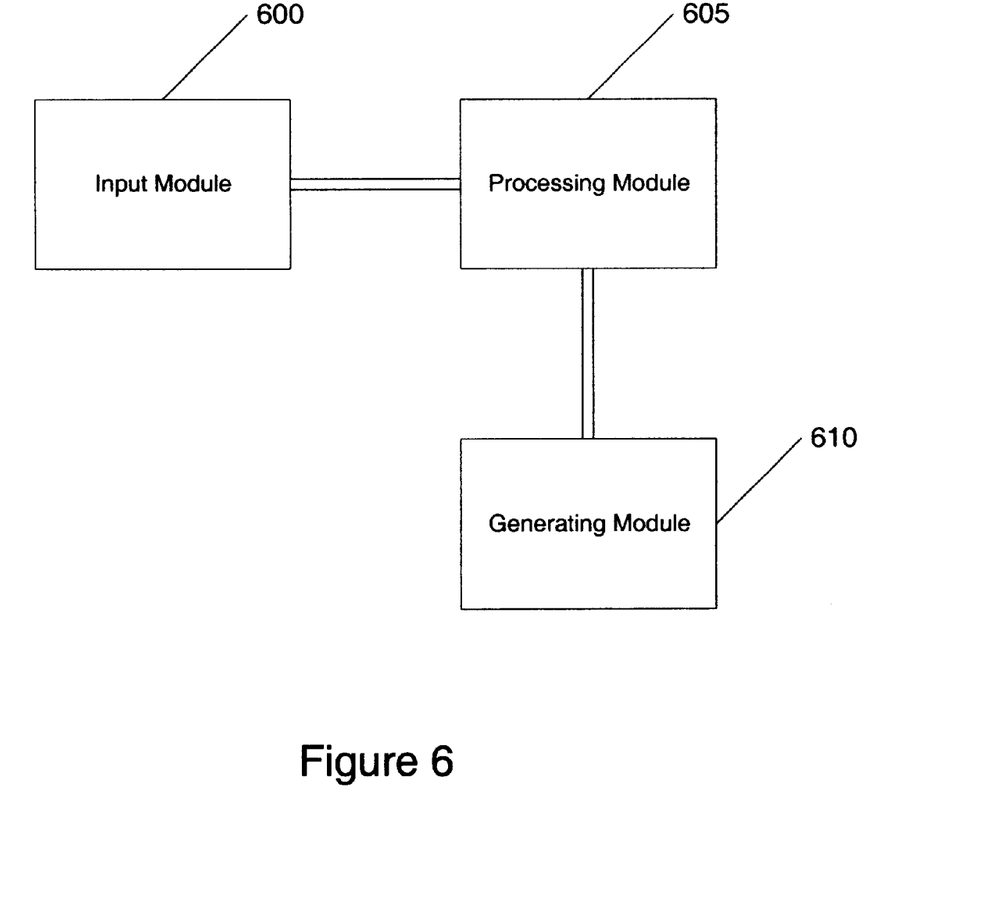
FIG. 6 is a block diagram of an exemplary apparatus for implementing various embodiments of the invention for an existing object-oriented program class.

FIG. 6 is a block diagram of an exemplary apparatus for implementing various embodiments of the invention for an existed OOP class. The apparatus includes input module hits 500, processing module 505, and generating module 510. In this exemplary apparatus, input module 500 reads the header file for the existing OOP class and reads the type file. Processing module 505, coupled to input module 500, parses the header file. Generating module 510, coupled to processing module 505, generates the output file (or files) for the component object, e.g., the source file, the interface file, and the header file.

The various embodiments of the invention may be implemented in any object management system. For example, the various embodiments may be implemented in DCOM, or in Common Object Request-Broker Architecture ("CORBA"). When implemented in DCOM, the component object supports the IUnknown interface, i.e., the component object implements IUnknown's functions. The IUnknown interface is the base interface for all DCOM interfaces. It controls the lifetime of the component object (i.e., tells the component object when it is done using the component object) and allows an OM client to access all the interfaces the component object can implement.

The various embodiments of the invention may also be implemented as preprogrammed hardware elements (for example, application specific integrated circuits or digital processors), or other related components.

The various embodiments of the invention may be also implemented as a computer program product for use with a computer system. Such implementation may include a series of computer instructions fixed either on a tangible medium, such as a computer readable media (for example, a diskette, CD-ROM, ROM, or fixed disk), or transmittable to a computer system via a modem or other interface device, such as a communications adapter connected to a network over a medium. The medium may be either a tangible medium (for example, optical or analog communications lines) or a medium implemented with wireless techniques (for example, microwave, infrared or other transmission techniques). The series of computer instructions preferably embodies all or part of the functionality previously described herein with respect to the system. Those skilled in the art should appreciate that such computer instructions can be written in a number of object management programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (for example, shrink wrapped software), preloaded with a computer system (for example, on system ROM or fixed disk), or distributed from a server or electronic bulletin board over the network (for example, the Internet or World Wide Web).

Although various embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A method for implementing one or more existing object-oriented program classes as component objects in an object management system, each class including one or more member functions, each class being defined in a header file, the method comprising:

building an information list, the information list including a list of the classes and the member functions in each class;

processing the information list, the processing including parsing the header file for each class;

automatically generating from the processed information list one or more output files for each component object, each component object implementing the member functions of one class wherein the one or more output files include a source file for each component object, an interface file for each component object, and a header file for each component object; and compiling the one or more output files into an object management server.

2. The method according to claim 1 wherein at least one class includes an excluded member function, further comprising:

omitting in the one or more output files for the component object for the at least one class computer code for implementing the excluded member function in the component object.

3. The method according to claim 1 wherein at least one class includes an override member function, further comprising:

pasting into the one or more output files for the component object for the at least one class the override member function for use in implementing the override member function in the component object.

4. The method according to claim 1 wherein at least one class includes an enums member function, the enums member function listed in an enums file, further comprising:

reading the enums file;
parsing the enums file; and
generating an enums interface file.

5. The method according to claim 4, further comprising:

compiling the one or more output files and the enums interface file into an object management server.

6. The method according to claim 1 wherein the one or more existing object-oriented program classes are C++ classes.

7. The method according to claim 1 wherein the object management system is a Distributed Component Object Model.

8. The method according to claim 1, further comprising:

reading a type file, the type file including computer code for converting between an object-oriented type and an object management type.

9. A computer program product for implementing one or more existing object-oriented program classes as component objects in an object management system, each class including one or more member functions, each class being defined in a header fie, the computer program product comprising a computer usable medium having computer readable program code thereon, the computer program product comprising:

program code for building an information list, the information list including a list of the classes and the member functions in each class;

program code for processing the information list, the processing including parsing the header file for each class;

program code for generating from the processed information list one or more output files for each component object, each component object implementing the member functions of one class wherein the one or more output files include a source file for each component object, an interface file for each component object, and a header file for each component object; and program code for compiling the one or more output files into an object management server.

10. The computer program product according to claim 9 wherein at least one class includes an excluded member function, further comprising:

program code for omitting in the one or more output files for the component object for the at least one class computer code for implementing the excluded member function in the component object.

11. The computer program product according to claim 9 wherein at least one class includes an override member function, further comprising:

program code for pasting into the one or more output files for the component object for the at least one class the override member function for use in implementing the override member function in the component object.

12. The computer program product according to claim 9 wherein at least one class includes an enums member function, the enums member function listed in an enums file, further comprising:

program code for reading the enums file;
program code for parsing the enums file; and
program code for generating an enums interface file.

13. The computer program product according to claim 12, further comprising:

compiling the one or more output files and the enums interface file into an object management server.

14. The computer program product according to claim 9 wherein the one or more existing object-oriented program classes are C++ classes.

15. The computer program product according to claim 9 wherein the object management system is a Distributed Component Object Model.

16. The computer program product according to claim 9 further comprising:

computer code for reading a type file, the type file including computer code for converting between an object-oriented type and an object management type.

17. A method for implementing an existing object-oriented program class as a component object in an object management system, the class being defined in a header file, the method comprising:

reading the header file, the header file including a list of member functions for the class;

parsing the header file;

reading a type file, the type file including computer code for converting between an object-oriented type and an object management type;

generating a source file for the component object comprising computer code for use in implementing the listed member functions in the object management system based on the conversion code in the type file;

generating an interface file for use in implementing the component object, the interface file when compiled comprising one or more object management interfaces for the class; and generating an object management header file for the component object.

18. The method according to claim 17, further comprising:

compiling the generated files into an object management server.

19. The method according to claim 17, further comprising:

reading an exclusion file, the exclusion file including a list of member functions which will not be implemented in the component object;

determining, prior to the generation of the source file, that the particular listed member function is an excluded member function; and omitting in the generated source file computer code for the particular listed member function.

20. The method according to claim 17, further comprising:
reading an override file for the class, the override file including specific conversion code for a listed member function;
determining, prior to the generation of the source file, that the particular listed member function is a function for which specific conversion code has been written; and
pasting, for the particular listed member function, the specific conversion code into the generated source file.

21. The method according to claim 17 wherein the component object has a unique identifier and the one or more object management interfaces each has a unique identifier.

22. The method according to claim 17, further comprising:
reading an enums file, the enums file including a list of enums used by the class;
parsing the enums file; and
generating an enums interface file.

23. The method according to claim 22, further comprising:
compiling the generated files into an object management server.

24. The method according to claim 17, further comprising:
generating an orphan file, the orphan file including a list of the listed member functions that will not be implemented in the component object.

25. The method according to claim 24 wherein the orphan file further includes the name of the header file containing the orphaned member function.

26. The method according to claim 17, further comprising:
generating an all-interfaces file that lists the one or more object management interfaces; and
generating an all-functions file that lists the member functions implemented in the component object.

27. The method according to claim 26, further comprising:
compiling the generated files into an object management server.

28. The method according to claim 26, further comprising:
generating a callback member function file that lists the member functions, implemented in the component object, that are callback member functions.

29. The method according to claim 28, further comprising:
compiling the generated files into an object management server.

30. The method according to claim 17 wherein the existing object-oriented program class is a C++ class.

31. The method according to claim 17 wherein the object management system is a Distributed Component Object Model.

32. A computer program product for implementing an existing object-oriented program class as a component object in an object management system, the class being defined in a header file, the computer program product comprising a computer usable medium having computer readable program code thereon, the computer program code comprising:
program code for reading the header file, the header file including a list of member functions for the class;
program code for parsing the header file;
program code for reading a type file, the type file including computer code for converting between an object-oriented type and an object management type;
program code for generating a source file for the component object comprising computer code for use in implementing the listed member functions in the object management system based on the conversion code in the type file;
program code for generating an interface file for use in implementing the component object, the interface file when compiled comprising one or more object management interfaces; and
program code for generating an object management header file for the component object.

33. The computer program product according to claim 32, further comprising:
program code for compiling the generated files into an object management server.

34. The computer program product according to claim 32, further comprising:
program code for reading an exclusion file, the exclusion file including a list of member functions which will not be implemented in the component object;
program code for determining, prior to the generation of the source file, that the particular listed member function is an excluded member function; and
program code for omitting in the generated source file computer code for the particular listed member function.

35. The computer program product according to claim 32, further comprising:
program code for reading an override file for the class, the overide file including specific conversion code for a listed member function;
program code for determining, prior to the generation of the source file, that the particular listed member function is a function for which specific conversion code has been written; and
program code for pasting, for the particular listed member function, the specific conversion code into the generated source file.

36. The computer program product according to claim 32 wherein the component object has a unique identifier and the one or more object management interfaces each have a unique identifier.

37. The computer program product according to claim 32, further comprising:
program code for reading an enums file, the enums file including a list of enums used by the class;
program code for parsing the enums file; and
program code for generating an enums interface file.

38. The computer program product according to claim 37, further comprising:
program code for compiling the generated flies into an object management server.

39. The computer program product according to claim 32, further comprising:
program code for generating an orphan file, the orphan file including a list of the listed member functions that will not be implemented in the component object.

40. The computer program product according to claim 39 wherein the orphan file further includes the name of the header file containing the orphaned member function.

41. The computer program product according to claim 32, further comprising:
    program code for generating an all-interfaces file that lists the one or more object management interfaces; and
    program code for generating an all-functions file that lists the member functions implemented in the component object.

42. The computer program product according to claim 41, further comprising:
    program code for compiling the generated files into an object management server.

43. The computer program code according to claim 41, further comprising:
    program code for generating a callback member function file that lists the member functions, implemented in the component object, that are callback member functions.

44. The computer program code according to claim 43, further comprising:
    compiling the generated files into an object management server.

45. The computer program product according to claim 32 wherein the existing object-oriented program class is a C++ class.

46. The computer program product according to claim 32 wherein the object management system is a Distributed Component Object Model.

47. A computer system for implementing an existing object-oriented program class as a component object in an object management system, the class being defined in a header file, the system comprising:
    means for reading the header file, the header file including a list of member functions for the class;
    means for parsing the header file;
    means for reading a type file, the type file including computer code for converting between an object-oriented type and an object management type;
    means for generating a source file for the component object comprising computer code for use in implementing the listed member functions in the object management system based on the conversion code in the type file;
    means for generating an interface file for use in implementing the component object, the interface file when compiled comprising one or more object management interfaces; and
    means for generating an object management header file for the component object.

48. The computer system according to claim 47, further comprising:
    means for compiling the generated files into an object management server.

49. The computer system according to claim 47, further comprising:
    means for reading an exclusion file, the exclusion file including a list of member functions which will not be implemented in the component object;
    means for determining, prior to the generation of the source file, that the particular listed member function is an excluded member function; and
    means for omitting in the generated source file computer code for the particular listed member function.

50. The computer system according to claim 47, further comprising:
    means for reading an override file for the class, the override file including specific conversion code for a listed member function;
    means for determining, prior to the generation of the source file, that the particular listed member function is a function for which specific conversion code has been written; and
    means for pasting, for the particular listed member function, the specific conversion code into the generated source file.

51. The computer system according to claim 47 wherein the component object has a unique identifier and the one or more object management interfaces each have a unique identifier.

52. The computer system according to claim 47, further comprising:
    means for reading an enums file, the enums file including a list of enums used by the class;
    means for parsing the enums file; and
    means for generating an enums interface file.

53. The computer system according to claim 52, further comprising:
    means for compiling the generated files into an object management server.

54. The computer system according to claim 47, further comprising:
    means for generating an orphan file, the orphan file including a list of the listed member functions that will not be implemented in the component object.

55. The computer system according to claim 54 wherein the orphan file further includes the name of the header file containing the orphaned member function.

56. The computer system according to claim 47, further comprising:
    means for generating an all-interfaces file that lists the one or more object management interfaces; and
    means for generating an all-functions file that lists the member functions implemented in the component object.

57. The computer system according to claim 56, further comprising:
    means for compiling the generated files into an object management server.

58. The computer system according to claim 56, further comprising:
    means for generating a callback member function file that lists the member functions, implemented in the component object, that are callback member functions.

59. The computer system according to claim 58, further comprising:
    means for compiling the generated files into an object management server.

60. The computer system according to claim 47 wherein the existing object-oriented program class is a C++ class.

61. The computer system according to claim 47 wherein the object management system is a Distributed Component Object Model.

* * * * *